United States Patent
Kanazawa et al.

(10) Patent No.: US 7,320,214 B2
(45) Date of Patent: Jan. 22, 2008

(54) EXHAUST GAS PURIFIER FOR INTERNAL COMBUSTION ENGINE

(75) Inventors: Shogo Kanazawa, Toyota (JP); Tatsumasa Sugiyama, Anjyo (JP); Yasuhiko Otsubo, Anjyo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/399,438

(22) Filed: Apr. 7, 2006

(65) Prior Publication Data

US 2006/0225411 A1 Oct. 12, 2006

(30) Foreign Application Priority Data

Apr. 8, 2005 (JP) .............. 2005-112850

(51) Int. Cl.
*F01N 3/00* (2006.01)
(52) U.S. Cl. .............. 60/286; 60/277; 60/297; 60/303; 60/311
(58) Field of Classification Search .............. 60/276, 60/277, 286, 295, 297, 303, 311
See application file for complete search history.

(56) References Cited

U.S. PATENT DOCUMENTS

| 5,193,340 | A | | 3/1993 | Kamihara | |
|---|---|---|---|---|---|
| 6,021,639 | A | * | 2/2000 | Abe et al. | 60/297 |
| 7,210,286 | B2 | * | 5/2007 | Sun et al. | 60/295 |
| 2003/0230076 | A1 | | 12/2003 | Kwon | |
| 2004/0128985 | A1 | | 7/2004 | Shimasaki et al. | |
| 2005/0000209 | A1 | | 1/2005 | Takahashi et al. | |
| 2005/0044845 | A1 | | 3/2005 | Onodera et al. | |

FOREIGN PATENT DOCUMENTS

| EP | 1 426 592 A2 | 6/2004 |
|---|---|---|
| EP | 1 512 860 A2 | 3/2005 |
| EP | 1 515 013 A2 | 3/2005 |
| JP | 2003-254038 | 9/2003 |
| JP | 2004-225579 | 8/2004 |

\* cited by examiner

*Primary Examiner*—Thomas Denion
*Assistant Examiner*—Diem Tran
(74) *Attorney, Agent, or Firm*—Oblon, Spivak, McClelland, Maier & Neustadt, P.C.

(57) ABSTRACT

Whether discharge of high-concentration, unburned fuel is indicated or not is determined based on air-fuel ratio AF, calculated air-fuel ratio AFc and exhaust temperature thco (S110, S112, S114). If it is determined that high-concentration, unburned fuel would be discharged ("no" in any of S110, S112, S114), amount of fuel addition per one addition is decreased in PM regeneration control (S116). Therefore, in a state where high concentration HC is to be discharged to the downstream of an exhaust purifying filter, the amount of fuel addition at one time is immediately decreased, so that discharge of high-concentration HC to the outside can be prevented, and generation of white smoke can reliably be prevented.

6 Claims, 6 Drawing Sheets

EXHAUST GAS PURIFIER FOR INTERNAL COMBUSTION ENGINE

This nonprovisional application is based on Japanese Patent Application No. 2005-112850 filed with the Japan Patent Office on Apr. 8, 2005, the entire contents of which are hereby incorporated by reference.

BACKGROUND OF THE INVENTION

1. Field of the Invention

The present invention relates to an exhaust gas purifier for an internal combustion engine including an exhaust purifying filter that can be regenerated by oxidizing particulate matter deposited through filtering of an exhaust gas, utilizing catalytic function, in which fuel is added to an exhaust system from upstream of the exhaust purifying filter, to execute a process of increasing temperature for purifying the particulate matter on the exhaust purifying filter, upon oxidizing the particulate matter.

2. Description of the Background Art

An internal combustion engine, particularly a diesel engine, adopts a technique of arranging an exhaust purifying filter in the exhaust system so that particulate matter contained in the exhaust gas is not discharged to the atmosphere. In such an internal combustion engine, it is necessary to remove the particulate matter deposited on the exhaust purifying filter for regeneration. Therefore, a technique has been known in which, when a certain amount of particulate matter has been deposited, a state of fuel injection is changed (to delayed injection) to increase the temperature of exhaust purifying filter, so as to oxidize and purify the particulate matter.

The fuel supplied by the delayed injection is burned in an expansion stroke, and therefore, full combustion of the entire fuel would not be attained. As a result, the exhaust gas comes to contain HC (carbon hydride) of high concentration. Consequently, sufficient burning cannot be attained at the exhaust purifying filter, either, possibly causing a problem of white smoke.

A technique has been known, in which a glow plug is used for heating a combustion chamber to promote atomization of the fuel, so that the entire fuel supplied by delayed injection is flamed up, whereby discharge of high-concentration HC to the exhaust gas can be prevented (see, for example, Japanese Patent Laying-Open No. 2004-225579, pp. 6-7, FIGS. 2-3).

In an exhaust gas purifier for an internal combustion engine of the type in which fuel is supplied from an addition valve provided in the exhaust system to the exhaust purifying filter and burned for increasing catalyst temperature, it is impossible to directly heat the added fuel by the glow plug and, therefore, atomization of the added fuel cannot be promoted. This may result in problematic emission.

By way of example, dependent on the state of operation of internal combustion engine, an amount of fuel injection might increase abruptly during regeneration control of the exhaust purifying filter. In such a case, the exhaust gas discharged from the combustion chamber has particularly low oxygen concentration. When fuel is added to the exhaust gas of such a low oxygen concentration, HC concentration resulting from the added fuel would be imbalanced to the higher concentration side, relative to the oxygen concentration, than in a normal fuel addition.

As described above, however, atomization of added fuel cannot be promoted by the glow plug, and therefore, sufficient burning of the added fuel is not always possible in the exhaust purifying filter. As a result, HC of high concentration would be discharged to the downstream of exhaust purifying filter, possibly causing the problem of white smoke.

SUMMARY OF THE INVENTION

An object of the present invention is, in an exhaust gas purifier for an internal combustion engine in which fuel is added from the upstream of an exhaust purifying filter to an exhaust system when a process for increasing temperature for purifying particulate matter is executed, to prevent discharge of high-concentration HC to the outside.

In the following, measures for attaining the above-described object as well as functions and effects thereof will be described.

The present invention provides an exhaust gas purifier for an internal combustion engine, including an exhaust purifying filter filtering particulate matter in the exhaust gas and allowing regeneration by oxidizing the deposited particulate matter, utilizing catalytic function, executing a process of increasing temperature for purifying the particulate matter on the exhaust purifying filter by adding fuel to an exhaust system from upstream of the exhaust purifying filter, upon oxidizing the particulate matter, including: an unburned fuel concentration physical amount detecting unit for detecting at least one of a physical amount reflecting unburned fuel concentration existing in the exhaust gas at the downstream of the exhaust purifying filter and a physical amount having an influence on the unburned fuel concentration; and an added fuel concentration decreasing unit decreasing, in the process of increasing temperature for purifying the particulate matter, when a value of physical amount detected by the unburned fuel concentration physical amount detecting unit indicates discharge of high-concentration unburned fuel, fuel concentration attained by addition in the process of increasing temperature for purifying the particulate matter.

In this manner, the added fuel concentration decreasing unit determines whether the physical amount indicates discharge of high-concentration, unburned fuel or not, and if it is determined that the high-concentration, unburned fuel would be discharged, decreases fuel concentration attained by addition in the process of increasing temperature for purifying the particulate matter. Therefore, even when sufficient burning of the added fuel in the exhaust purifying filter cannot be attained because of abrupt increase of fuel injection amount or the like during the process of increasing temperature for purifying the particulate matter, causing discharge of high-concentration HC to the downstream of exhaust purifying filter, the fuel concentration attained by addition can immediately be decreased, and therefore, discharge of high-concentration HC can be suppressed. In this manner, discharge of high-concentration HC to the outside can be prevented in an exhaust gas purifier for an internal combustion engine in which fuel is added from the upstream of an exhaust purifying filter to an exhaust system when a process for increasing temperature for purifying particulate matter is executed.

Preferably, addition of fuel in the process of increasing temperature for purifying the particulate matter is performed a plurality of times periodically, and the added fuel concentration decreasing unit decreases amount of fuel addition of each time of addition, so as to decrease fuel concentration attained by addition in the process of increasing temperature for purifying the particulate matter.

By such periodical addition, the fuel concentration attained by addition can effectively be reduced, by decreasing the amount of fuel addition at one time. Thus, discharge of high-concentration HC to the outside can be prevented and generation of white smoke can also be prevented.

More preferably, the unburned fuel concentration physical amount detecting unit includes an air-fuel ratio detecting unit detecting, as the physical amount, air-fuel ratio of the exhaust gas downstream of a position of fuel addition in an exhaust system, and in the process of increasing temperature for purifying the particulate matter, the added fuel concentration decreasing unit determines that a state in which the air-fuel ratio detected by the air-fuel ratio detecting unit is smaller than a reference air-fuel ratio for determining high-concentration state of fuel indicates the state where the value of physical amount indicates discharge of high-concentration unburned fuel, and decreases fuel concentration attained by addition in the process of increasing temperature for purifying the particulate matter.

As described above, the air-fuel ratio downstream of the position of fuel addition may be used as the physical amount. If the air-fuel ratio is smaller than the reference air-fuel ratio, it is considered to represent discharge of high-concentration, unburned fuel. Therefore, by decreasing fuel concentration attained by addition, discharge of high-concentration HC to the outside can be prevented. As a result, generation of white smoke can also be prevented.

The unburned fuel concentration physical amount detecting unit includes an air-fuel ratio detecting unit detecting, as the physical amount, air-fuel ratio of the exhaust gas by air-fuel ratio calculation based on an amount of fuel burned by the combustion engine, an amount of fuel added in an exhaust system and an amount of intake air of the internal combustion engine; and in the process of increasing temperature for purifying the particulate matter, the added fuel concentration decreasing unit determines that a state in which the air-fuel ratio detected by the air-fuel ratio detecting unit is smaller than a reference air-fuel ratio for determining high-concentration state of fuel indicates the state where the value of physical amount indicates discharge of high-concentration unburned fuel, and decreases fuel concentration attained by addition in the process of increasing temperature for purifying the particulate matter.

As described above, the air-fuel ratio of the exhaust gas calculated based on the fuel amount burned in the internal combustion engine, the fuel amount added in the exhaust system and intake air amount of the internal combustion engine may be used as the physical amount. This also enables determination as to whether high-concentration, unburned fuel would be discharged or not, and by decreasing fuel concentration attained by addition, discharge of high-concentration HC to the outside can be prevented. As a result, generation of white smoke can also be prevented.

More preferably, the unburned fuel concentration physical amount detecting unit includes, in addition to the air-fuel ratio detecting unit, a catalyst temperature detecting unit detecting catalyst temperature of the exhaust purifying filter; and in the process of increasing temperature for purifying the particulate matter, the added fuel concentration decreasing unit determines that a state in which the air-fuel ratio detected by the air-fuel ratio detecting unit is smaller than the reference air-fuel ratio and the catalyst temperature detected by the catalyst temperature detecting unit is lower than a reference temperature for determining degradation of oxidation catalysis indicates the state where the value of physical amount indicates discharge of high-concentration unburned fuel, and decreases fuel concentration attained by addition in the process of increasing temperature for purifying the particulate matter.

In addition to the air-fuel ratio, catalyst temperature may further be included as the object of determination. When the catalyst temperature is low, oxidation catalysis itself decreases, and therefore, consumption of fuel by oxidation becomes difficult at the exhaust purifying filter. Therefore, when the air-fuel ratio is smaller than the reference air-fuel ratio and the catalyst temperature is lower than a reference temperature, the condition is considered to indicate discharge of high-concentration HC to the outside, and the fuel concentration attained by addition in the process of increasing temperature for purifying the particulate matter may be decreased, whereby discharge of high-concentration HC to the outside can be prevented. As a result, the amount of fuel addition can be reduced only in the region where possibility of white smoke generation is high. Accordingly, the process of increasing temperature for purifying the particulate matter can be executed quickly with high efficiency.

More preferably, the unburned fuel concentration physical amount detecting unit includes a catalyst temperature detecting unit detecting, as the physical amount, catalyst temperature of the exhaust purifying filter, and the added fuel concentration decreasing unit determines that a state in which the catalyst temperature detected by the catalyst temperature detecting unit in the process of increasing temperature for purifying the particulate matter is lower than a reference temperature for determining degradation of oxidation catalysis indicates the state where the value of physical amount indicates discharge of high-concentration unburned fuel, and decreases fuel concentration attained by addition in the process of increasing temperature for purifying the particulate matter.

The catalyst temperature of exhaust purifying filter may be used as the physical amount. As described above, when the catalyst temperature is low, oxidation catalysis itself decreases, and therefore, consumption of fuel by oxidation becomes difficult at the exhaust purifying filter. Therefore, when the catalyst temperature is lower than a reference temperature, the condition is considered to indicate discharge of high-concentration HC to the outside, and the fuel concentration attained by addition in the process of increasing temperature for purifying the particulate matter may be decreased, whereby discharge of high-concentration HC to the outside can be prevented. As a result, generation of white smoke can also be prevented.

More preferably, the added fuel concentration decreasing unit determines that a state in which unburned fuel concentration is out of a range not discharging white smoke indicates the state where the value of physical amount indicates discharge of high-concentration unburned fuel.

By such setting, white smoke can more reliably be prevented, in the process for decreasing fuel concentration attained by addition. More preferably, the exhaust gas purifier for an internal combustion engine is applied to an internal combustion engine having a turbo charger with an exhaust turbine arranged downstream of a position where the fuel is added, in the exhaust system.

Particularly, the exhaust gas having fuel added thereto affects the state of atomization as it passes through an exhaust turbine of a turbo charger, and the ratio of purification by oxidation catalysis in the exhaust purifying filter to be passed thereafter decreases. Therefore, by applying the exhaust purifier for an internal combustion engine having the above-described structure to the internal combustion engine having the turbo charger arranged in this manner, remarkable effect of preventing discharge of high-concentration HC to the outside can be attained. As a result, generation of white smoke can also be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
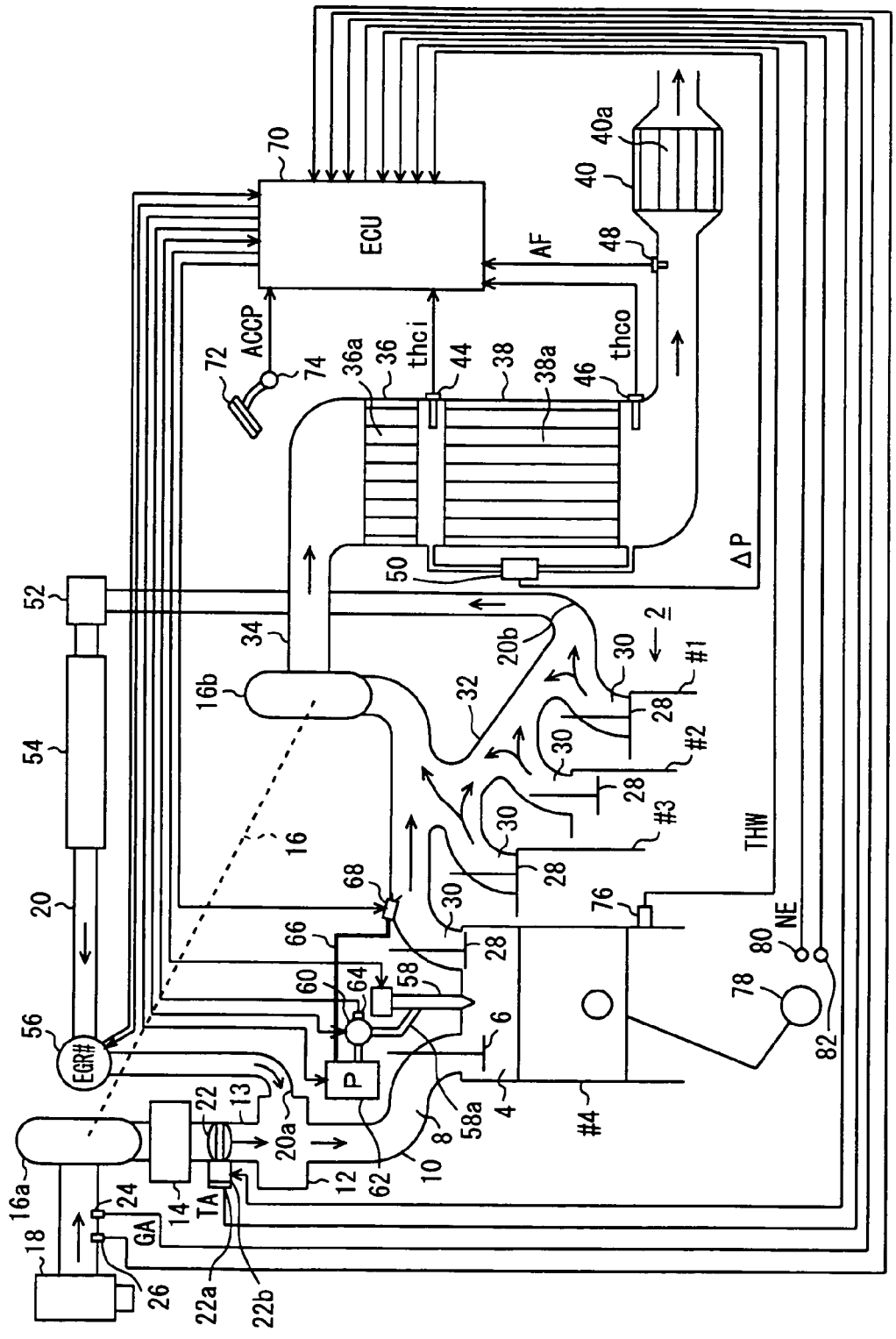
FIG. 1 is a schematic illustration showing a configuration of an automotive diesel engine and a system attaining the function of an exhaust purifier for an internal combustion engine, in accordance with a first embodiment of the present invention.

FIG. 1 is a schematic illustration showing a configuration of an automotive diesel engine and a system attaining the function of an exhaust purifier for an internal combustion engine, to which the above-described invention is applied. It is noted that the present invention is also applicable to a lean combustion type gasoline engine or the like having similar catalyst arrangement.

A diesel engine 2 includes a plurality of cylinders, and in this example, four cylinders #1, #2, #3 and #4. The number of cylinders is not limited. A combustion chamber 4 of each of the cylinders #1 to #4 is coupled through an intake port 8 that is opened/closed by an intake valve 6 and an intake manifold 10 to a surge tank 12. Surge tank 12 is coupled through an intake passage 13 to an inter cooler 14, and further to an outlet side of compressor 16a of an exhaust turbo charger 16, as a supercharger. The inlet side of compressor 16a is coupled to an air cleaner 18. An EGR (Exhaust Gas Recirculation) gas supply inlet 20a of an EGR path 20 is opened to surge tank 12. In intake passage 13 between surge tank 12 and inter cooler 14, a throttle valve 22 is arranged, and between compressor 16a and air cleaner 18, an intake air amount sensor 24 and an intake air temperature sensor 26 are arranged.

Combustion chamber 4 of each of the cylinders #1 to #4 is coupled to an inlet side of an exhaust turbine 16b of exhaust turbo charger 16 through an exhaust port 30 that is opened and closed by an exhaust valve 28 and an exhaust manifold 32, and the outlet side of exhaust turbine 16b is connected to an exhaust passage 34. Exhaust gas is introduced to exhaust turbine 16b from the side of forth cylinder #4, at exhaust manifold 32.

Along the exhaust passage 34, three catalytic converters 36, 38 and 40 containing exhaust purifying catalyst are arranged. The first catalytic converter 36 at the uppermost stream contains an NOx storage reduction catalyst 36a. In a normal operation of diesel engine 2, when the exhaust gas is in an oxidizing atmosphere (lean), NOx is absorbed by NOx storage reduction catalyst 36a. In a reducing atmosphere (at the state of stoichiometric air-fuel ratio or air-fuel ratio lower than that), NOx that has been stored in NOx storage reduction catalyst 36a is separated as NO and reduced by HC or CO. This realizes purification of NOx.

The second catalytic converter 40 arranged at the second upstream position contains a filter 38a (corresponding to exhaust purifying filter) having a wall portion formed to have a monolith structure, and the exhaust gas passes through pores of the wall portion. On the surface of pores in filter 38a, a layer of NOx storage reduction catalyst is formed as a coating, which functions as an exhaust purifying catalyst and attains purification of NOx in the manner described above. Further, on the wall portion of the filter, particulate matter (hereinafter denoted by PM) in the exhaust gas is trapped and deposited. By realizing high-temperature oxidizing atmosphere, oxidation of the deposited PM by active oxygen generated at the time when NOx is stored starts, and by excessive oxygen in the ambient atmosphere, PM as a whole is oxidized. This attains purification of NOx and purification of PM through oxidation. Here, the first catalytic converter 36 and the second catalytic converter 38 are formed as an integrated structure.

The third catalytic converter 40 at the most downstream position contains an oxidizing catalyst 40a, by which HC and CO are oxidized and purified.

Between NOx storage reduction catalyst 36a and filter 38a, a first exhaust temperature sensor 44 is arranged. Between filter 38a and oxidizing catalyst 40a, a second exhaust temperature sensor 46 is arranged close to filter 38a, and an air-fuel ratio sensor 48 is arranged close to oxidizing catalyst 40a.

Air-fuel ratio sensor 48 here utilizes solid electrolyte, and it detects air-fuel ratio of the exhaust gas based on the components of exhaust gas, and linearly outputs a voltage signal in proportion to the air-fuel ratio. The first and second exhaust temperature sensors 44 and 46 detect exhaust temperatures thci and thco at respective positions.

On the upstream side and downstream side of filter 38a, pipes for a differential pressure sensor 50 are provided, and differential pressure sensor 50 detects differential pressure ΔP between the upstream and downstream of filter 38a for detecting degree of clogging of the filter, that is, degree of PM deposition.

An EGR gas inlet port 20b of EGR path 20 is opened to exhaust manifold 32. The EGR gas inlet port 20b is opened on the side of the first cylinder #1, that is, opposite to the side of the fourth cylinder #4, where the exhaust gas is introduced by exhaust turbine 16b.

Along the EGR path 20, an iron based EGR catalyst 52 for reforming EGR gas, and an EGR cooler 54 for cooling the EGR gas are arranged, from the side of EGR gas inlet 20b. EGR catalyst 52 also has a function of preventing clogging of EGR cooler 54. On the side of EGR gas supply inlet 20a, an EGR valve 56 is arranged. By adjusting opening position of EGR valve 56, the amount of EGR gas from the EGR gas supply inlet 20a to the intake system can be adjusted.

A fuel injection valve 58 arranged in each of the cylinders #1 to #4 for directly injecting fuel to each combustion chamber 4 is coupled through a fuel supply pipe 58a to a common rail 60. To common rail 60, the fuel is supplied from an electrically controlled, discharge amount variable type fuel pump 62, and the fuel of high pressure supplied from fuel pump 62 to common rail 60 is distributed and supplied to each fuel injection valve 58 through each fuel supply pipe 58a. A fuel pressure sensor 64 for detecting the fuel pressure is mounted on common rail 60.

Further, from fuel pump 62, fuel of low pressure is supplied separately through a fuel supply pipe 66 to an addition valve 68. Addition valve 68 is provided at an exhaust port 30 of the fourth cylinder #4, for adding fuel to the exhaust gas by injecting fuel toward exhaust turbine 16b. By the addition of fuel, a catalyst control mode, which will be described later, is executed.

An electronic control unit (hereinafter denoted by "ECU") 70 is formed mainly of a digital computer including a CPU, an ROM and an RAM, and driving circuits for driving various devices. ECU 70 reads signals of the above-described intake air amount sensor 24, intake air temperature sensor 26, first and second exhaust temperature sensors 44 and 46, air-fuel ratio sensor 48, differential pressure sensor 50, EGR open position sensor in EGR valve 56, fuel pressure sensor 64 and throttle open position sensor 22a. Further, it also reads signals from an accelerator position sensor 74 detecting the amount of pressing of an acceleration pedal 72 (accelerator position: ACCP), and a cooling water temperature sensor 76 detecting temperature of cooling water of diesel engine 2. Further, it reads signals from an engine speed sensor 80 detecting the number of rotation NE (rpm) of a crank shaft 78, and a cylinder determination sensor 82 determining a cylinder by detecting rotation phase of crank shaft 78 or rotation phase of intake cum.

Based on the state of engine operation obtained from these signals, ECU 70 executes fuel injection amount control and fuel injection timing control by fuel injection valve 58. Further, it executes catalyst control and other processes, including PM regeneration control, which will be described later, S-poisoning recovery control and NOx reduction control, by open position control of EGR valve 56, throttle open position control by a motor 22b, discharge amount control of fuel pump 62, and valve opening control of addition valve 68.

As a combustion mode control executed by ECU 70, a combustion mode selected from two modes, that is, normal combustion mode and low-temperature combustion mode, is executed in accordance with the state of operation. Here, in the low-temperature combustion mode, using an EGR valve open position map for low-temperature combustion mode, a large amount of exhaust gas is re-circulated to slow down increase of combustion temperature, so that NOx and the smoke are reduced simultaneously. The low-temperature combustion mode is executed in a low-load and low-to-middle rotation range, and an air-fuel ratio feedback control is effected through adjustment of throttle open position TA, based on the air-fuel ratio AF detected by air-fuel ratio sensor 48. The combustion mode other than this is referred to as the normal combustion mode, in which a normal EGR control (including no EGR) is executed using an EGR valve open position map for normal combustion mode.

The catalyst control mode for executing catalyst control on the exhaust purifying catalyst includes four modes, that is, PM regeneration mode, S-poisoning recovery control mode, NOx reduction control mode and normal control mode.

The PM regeneration mode is for executing the process for increasing temperature for purifying PM, in which, when an estimated amount of deposited PM reaches a PM regeneration reference value, PM deposited particularly on filter 38a of the second catalytic converter 38 is burned by increasing temperature as described above, to be discharged as $CO_2$ and $H_2O$. In this mode, fuel addition from addition valve 68 in a state of higher air-fuel ratio than the stoichiometric state (theoretical air-fuel ratio) is executed periodically to increase the catalyst temperature (for example, to 600° C.~700° C.). Further, an after-injection by fuel injection valve 58, which is fuel injection to combustion chamber 4 in an expansion stroke or exhaust stroke, may sometimes be added.

It is noted that, in the PM regeneration control mode, a burn-up type temperature increasing process by intermittent addition process may be executed. In the intermittent addition process, an air-fuel ratio decreasing process to set the air-fuel ratio to the stoichiometric ratio or slightly lower than the stoichiometric ratio by intermittent fuel addition from addition valve 68 is performed with an interval in which fuel is not added at all. Here, a process to attain rich air-fuel ratio that is slightly lower than the stoichiometric ratio is performed. The after-injection by fuel injection valve 58 may also be added in this process. This realizes a function of fully burning PM (burn-up), whereby clogging of PM at a front end surface of NOx storage reduction catalyst 36a is cleared, and PM deposited in filter 38a is burned out.

The S-poisoning recovery control mode is performed, when NOx storage reduction catalyst 36a and filter 38a are poisoned by S (sulfur) and the ability of NOx storage deteriorates, for discharging S component and recovering from S-poisoning. In this mode, a temperature increasing process in which fuel addition from addition valve 68 is repeated to increase the catalyst temperature (for example, to 650° C.) is executed, and further, air-fuel ratio decreasing process, in which air-fuel ratio is set to be slightly lower than the stoichiometric ratio by intermittent fuel addition from addition valve 68, is executed. Here, a process to attain rich air-fuel ratio that is slightly lower than the stoichiometric ratio is performed. The after-injection by fuel injection valve 58 may also be added in this mode.

In the NOx reduction control mode, NOx stored in NOx storage reduction catalyst 36a and filter 38a is reduced to $N_2$ and $CO_2$ to be discharged. In this mode, by intermittent fuel addition with relatively long interval from addition valve 68, the catalyst temperature is set relatively low (for example, 250° C.~500° C.), and the air-fuel ratio is set to the stoichometric ratio or lower.

A state not in any of these three modes corresponds to the normal control mode, and in the normal control mode, fuel addition from addition valve 68 or after-injection by fuel injection valve 58 is not performed.

Figure 2:
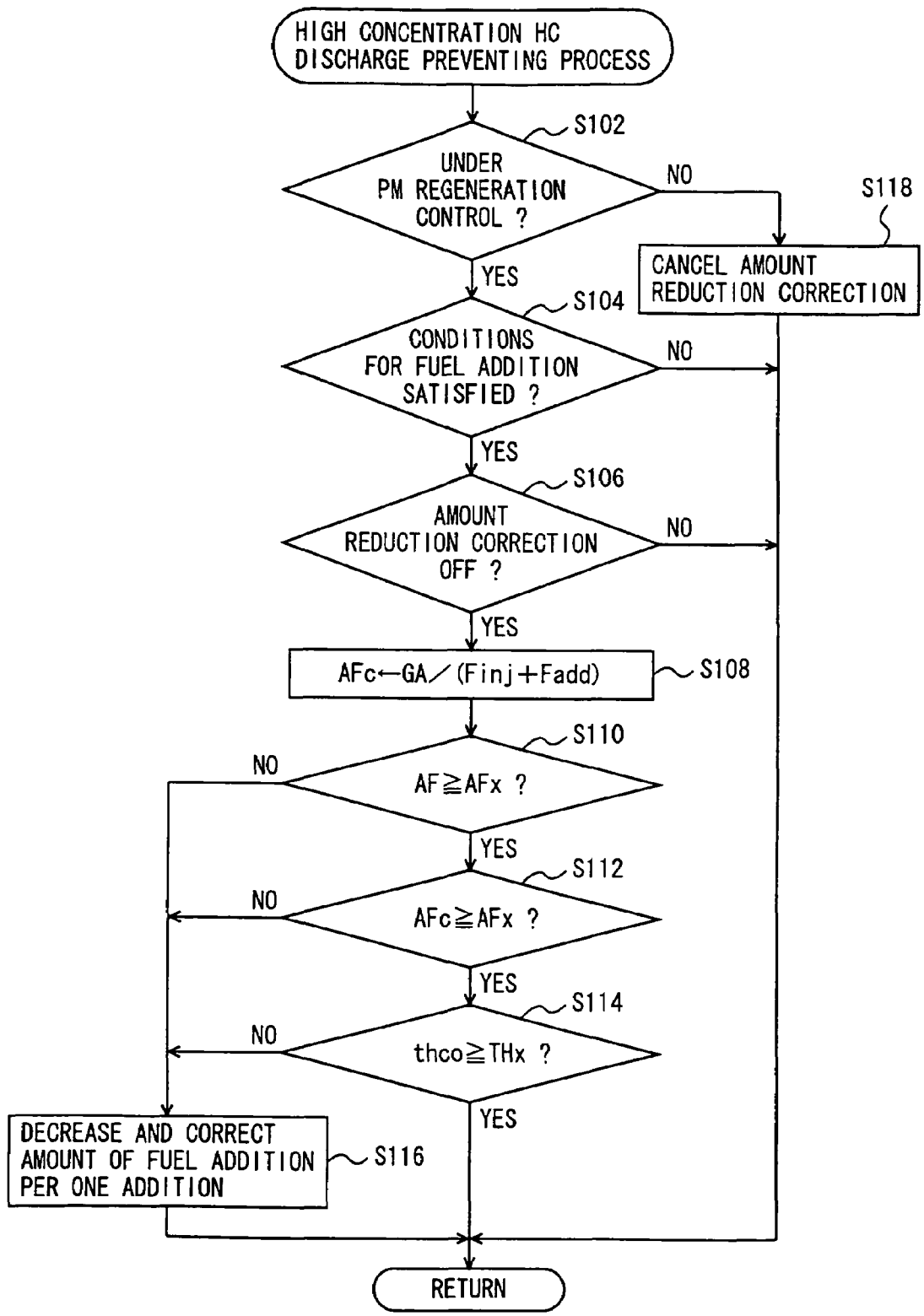
FIG. 2 is a flowchart representing an example of high-concentration HC discharge preventing process in accordance with the first embodiment.

FIG. 2 is a flowchart representing a high-concentration HC discharge preventing process executed by ECU 70. The process is executed in an interrupting manner, at a prescribed time interval. Steps in the flowchart corresponding to various process contents will be denoted by "S~".

When the high-concentration HC discharge preventing process starts, first, whether the PM regeneration control is being executed or not is determined (S102). If PM regeneration control is not being executed ("no" in S102), amount reduction correction for fuel amount per one addition is canceled (S118), and the present process is temporarily stopped. The process for canceling the amount reduction correction is, when amount reduction correction as the fuel addition amount decreasing correction process (S116), which will be described later, has been continued immediately before this process, to cancel the amount reduction correction. If amount reduction correction has not been performed, no particular process is done in step S118.

If PM regeneration control is being executed ("yes" in S102), whether conditions for fuel addition are satisfied or not is determined next (S104). By way of example, it is possible that part of fuel added from addition valve 68 during PM regeneration control adheres and is deposited on the exhaust system, and if the exhaust gas flow rate abruptly increases due to acceleration, the deposited fuel might vaporize quickly and join the added fuel. In order to prevent such a phenomenon, a process for temporarily inhibiting fuel addition may be performed. The conditions for fuel addition may not be satisfied because of such a process. If the conditions for fuel addition are not satisfied ("no" in S104), fuel addition is not performed, and the present process is temporarily stopped.

If the conditions for fuel addition are satisfied ("yes" in S104), whether the amount reduction correction as the fuel addition amount decreasing correction process (S116), which will be described next, is OFF or not is determined (S106). If the amount reduction correction is OFF ("yes" in S106), a calculated air-fuel ratio AFc of exhaust gas flowing to catalytic converters 36 and 38 is calculated, from intake air amount GA (g/s), fuel injection amount Finj (g/s) and fuel addition amount Fadd (g/s), as represented by Equation 1.

$$AFc \leftarrow GA/(Finj+Fadd) \quad [\text{Equation 1}]$$

The intake air amount is a value detected by intake air amount sensor 24, fuel injection amount Finj is an amount of fuel injected from fuel injection valve 58, and fuel addition amount Fadd is an amount of fuel added from addition valve 68 to the exhaust gas. Here, fuel injection amount Finj and fuel addition amount Fadd are calculated as the amount of injection and amount of addition per unit time, in consideration of fuel pressure, from the fuel amounts that are set as target values for fuel injection control and fuel addition control.

Next, whether the value of air-fuel ratio AF detected at present by air-fuel ratio sensor 48 is not lower than a reference air-fuel ratio AFx or not is set (S110). The reference air-fuel ratio AFx is a value for determining whether the fuel is in a state of high-concentration or not, while fuel is injected periodically during PM regeneration control. Here, a lower limit value of air-fuel ratio detected by air-fuel ratio sensor 48 that does not cause white smoke is set as this reference value.

Therefore, as long as the measured air-fuel ratio is equal to or higher than the reference air-fuel ratio FAx, the exhaust gas discharged from filter 38a has the air-fuel ratio that does not cause white smoke, that is, HC concentration low enough not to cause white smoke.

If $AF \geq AFx$ ("yes" in S110), then, whether the calculated air-fuel ratio AFc calculated in the above-described manner is equal to or higher than the reference air-fuel ratio AFx or not is set (S112).

If the calculated air-fuel ratio AFc, which is a calculational ratio, is also equal to or higher than reference air-fuel ratio AFx ("yes" in S112), then, whether the exhaust temperature thco immediately downstream of filter 38a detected at present by the second exhaust temperature sensor 46 is equal to or higher than a reference temperature THx or not is determined (S114). The reference temperature THx is the reference catalyst temperature for determining degradation of oxidation catalysis, when fuel is added periodically during PM regeneration control. Here, it is a reference temperature for the exhaust gas temperature thco detected by the second exhaust temperature sensor 46, and a lower limit of catalyst temperature that does not cause white smoke, as consumption (purification) of fuel proceeds because of high catalytic activity of filter 38a, is set as this reference temperature.

Therefore, if the actually measured exhaust gas temperature thco is equal to or higher than the reference temperature THx, it means that the catalytic activity of filter 38a is sufficiently high and the fuel is fully consumed, so that the exhaust gas comes to have low HC concentration that does not cause white smoke when discharged to the outside.

Here, if the exhaust gas temperature thco is equal to or higher than the reference temperature THx ("yes" in S114), the process is temporarily stopped. Therefore, if determinations of steps S110, S112 and S114 are all "yes", the amount reduction correction for the fuel addition amount decreasing correction process is not performed.

If one of the determinations of steps S110, S112 and S114 is "no", that is, if any of the conditions $AF \geq AFx$, $AFc \geq AFx$ and $thco \geq THx$ is unsatisfied, the fuel addition amount decreasing correction process (S116) is executed.

In the fuel addition amount decreasing correction process, the amount reduction correction is executed on the fuel addition amount per one addition. Specifically, a fuel addition amount for white smoke suppression set in advance as a value smaller than fuel addition amount per one addition set for normal PM regeneration control is used as the target fuel addition amount per one addition. Alternatively, a product of fuel addition amount per one addition for normal operation by a preset reduction coefficient Kdel (<1), or a value obtained by subtracting a preset constant amount (<fuel addition amount per one addition) from the fuel addition amount per one addition for normal operation may be used as the target fuel addition amount per one addition.

Consequently, in the continued PM regeneration control thereafter, PM regeneration is performed with the amount of fuel addition smaller at each addition than in the normal PM regeneration control. As a result, duration of each PM regeneration becomes longer.

In the control period following the high-concentration HC discharge preventing process (FIG. 2), even if determinations of steps S102 and S104 are "yes", determinations of steps S110, S112 and S114 are not executed again, as the amount reduction correction is ON ("no" in S106).

Thereafter, when PM regeneration control ends ("no" in S102), the amount reduction correction on the amount of fuel addition per one addition is cleared (S118), and the present process is temporarily stopped. Thereafter, the determination of "no" at step S102 continues until the next PM regeneration control starts. If the PM regeneration control starts again ("yes" in S102), the process described above is repeated.

Figure 3:
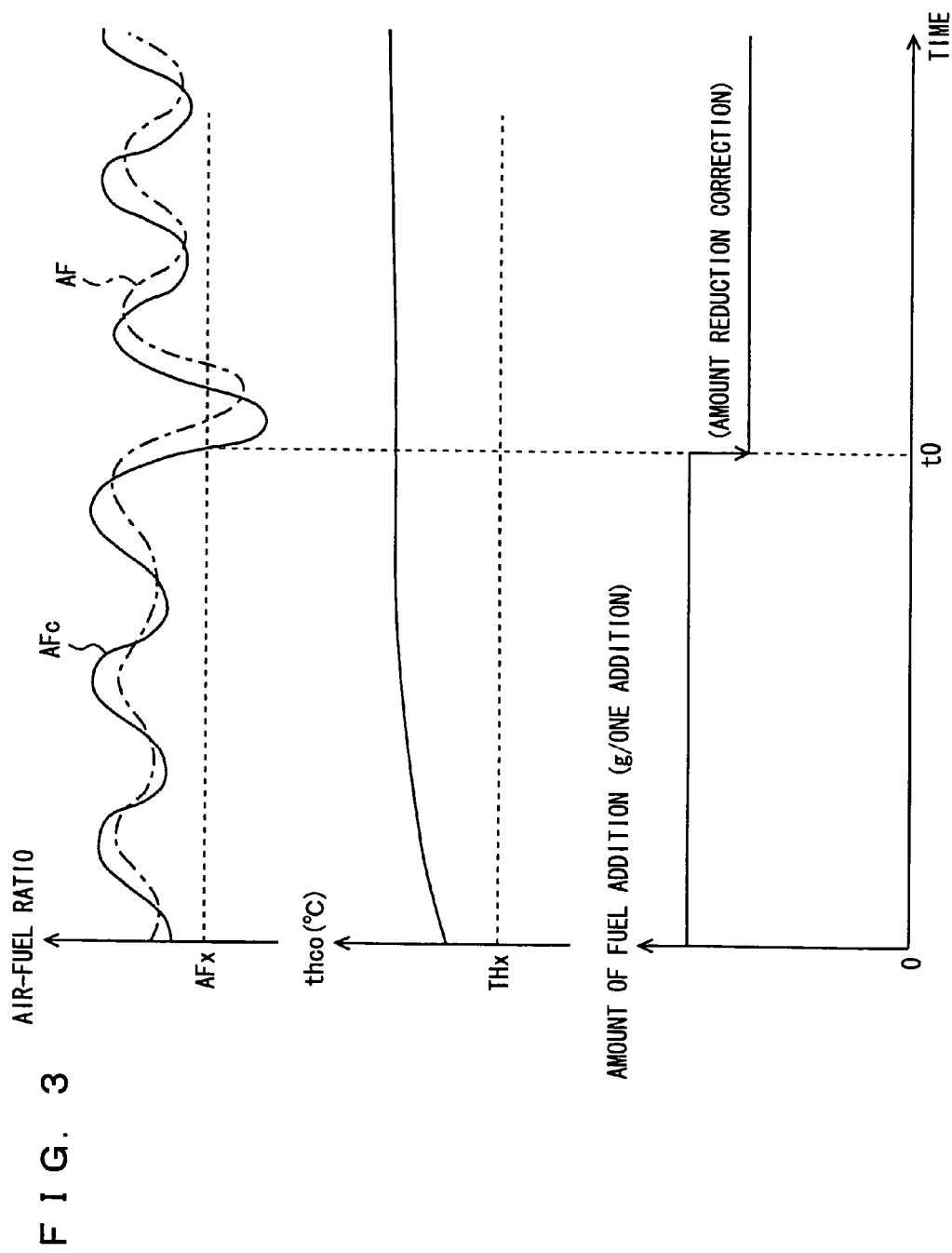
FIG. 3 is a timing chart representing an example of the process in accordance with the first embodiment.

FIG. 3 is a timing chart representing an example of control when calculated air-fuel ratio AFc becomes smaller than the reference air-fuel ratio AFx. As AFc<AFx ("no" in S112), the amount of fuel addition at one time is reduced (S116: t0). Consequently, the calculated air-fuel ratio AFc and the actually measured air-fuel ratio AF increase, whereby generation of white smoke caused by the discharge of high-concentration HC to the outside can be prevented.

Figure 4:
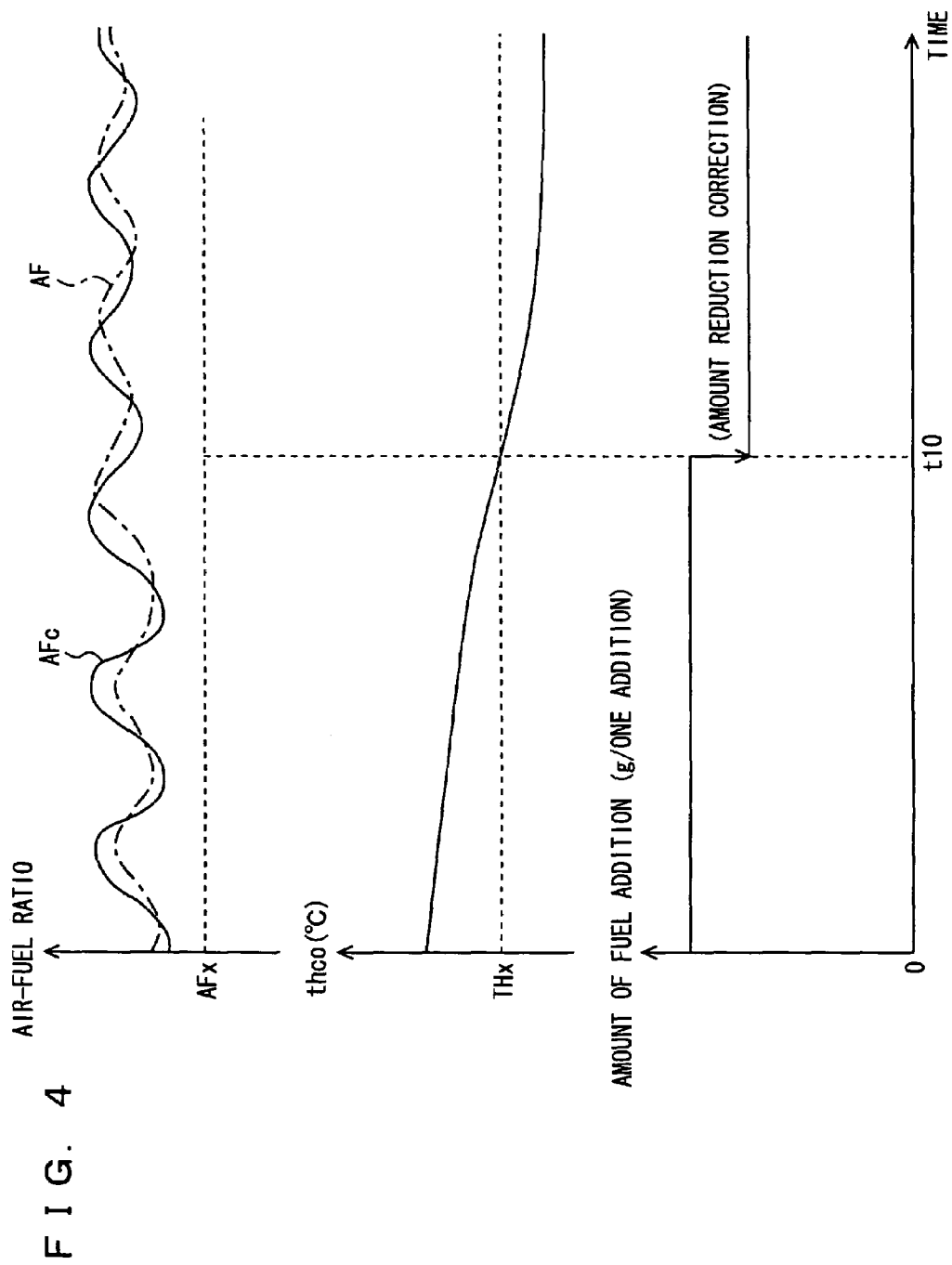
FIG. 4 is a timing chart representing an example of the process in accordance with the first embodiment.

FIG. 4 is a timing chart representing an example of control when exhaust gas temperature thco becomes lower than the reference temperature THx. As thco<THx ("no" in S114), the amount of fuel addition at one time is reduced (S116: t10). Consequently, the calculated air-fuel ratio AFc and the actually measured air-fuel ratio AF increase, whereby generation of white smoke caused by the discharge of high-concentration HC to the outside can be prevented.

In the structure described above, ECU 70 corresponds to the unburned fuel concentration physical amount detecting unit, added fuel concentration decreasing unit and air-fuel ratio detecting unit; air-fuel ratio sensor 48 corresponds to the air-fuel ratio detecting unit; and the second exhaust temperature sensor corresponds to the catalyst temperature detecting unit. The process of step S108 of high-concentration HC discharge preventing process (FIG. 2) corresponds to the process performed by the air-fuel ratio detecting unit, and the process other than step S108 corresponds to the process performed by the added fuel concentration decreasing unit.

The above-described first embodiment of the present invention provides the following effects.

(A) By the determinations of steps S110, S112 and S114 of high-concentration HC discharge preventing process (FIG. 2), whether high-concentration, unburned fuel would be discharged or not can be determined based on respective physical amounts (air-fuel ratio AF, calculated air-fuel ratio AFc, exhaust temperature thco corresponding to the catalyst temperature). When it is determined that high-concentration, unburned fuel would be discharged ("no" in any of S110, S112 and S114), the amount of fuel addition at one time is reduced and corrected (S116) in the PM regeneration control (corresponding to the process for increasing temperature for purifying particulate matter).

Therefore, when the fuel injection amount Finj increases abruptly during PM regeneration control, for example, and the exhaust gas comes to have low oxygen concentration to prevent sufficient burning of added fuel in filter 38a, possibly causing discharge of high-concentration HC to the downstream of filter 38a, the amount of fuel addition per one addition is immediately reduced. Therefore, discharge of high-concentration HC to the outside can be prevented.

Particularly, in each step of determination (S110, S112, S114), when the unburned fuel concentration is out of the range that does not cause white smoke (the range equal to or higher than the reference air-fuel ratio, the range equal to or higher than the reference temperature THx), it is determined to indicate possible discharge of high-concentration, unburned fuel, and the amount of fuel addition per one addition is reduced. Accordingly, generation of white smoke, in particular, can be prevented with high reliability.

(B) In the exhaust system, exhaust turbine 16b of exhaust turbo charger 16 is arranged downstream of the position of addition by addition valve 68. Therefore, the exhaust gas with the fuel added thereto from addition valve 68 is affected in atomization of added fuel when it passes through exhaust turbine 16b, and purification ratio by oxidation catalysis in filter 38a through which the exhaust gas passes thereafter decreases. Thus, discharge of high-concentration HC to the outside becomes more likely.

By the present invention, however, discharge of high-concentration HC to the outside can sufficiently be prevented, and therefore, remarkable effect can be attained particularly in diesel engine 2 having exhaust turbo charger, and generation of white smoke can be prevented.

Second Embodiment

Figure 5:
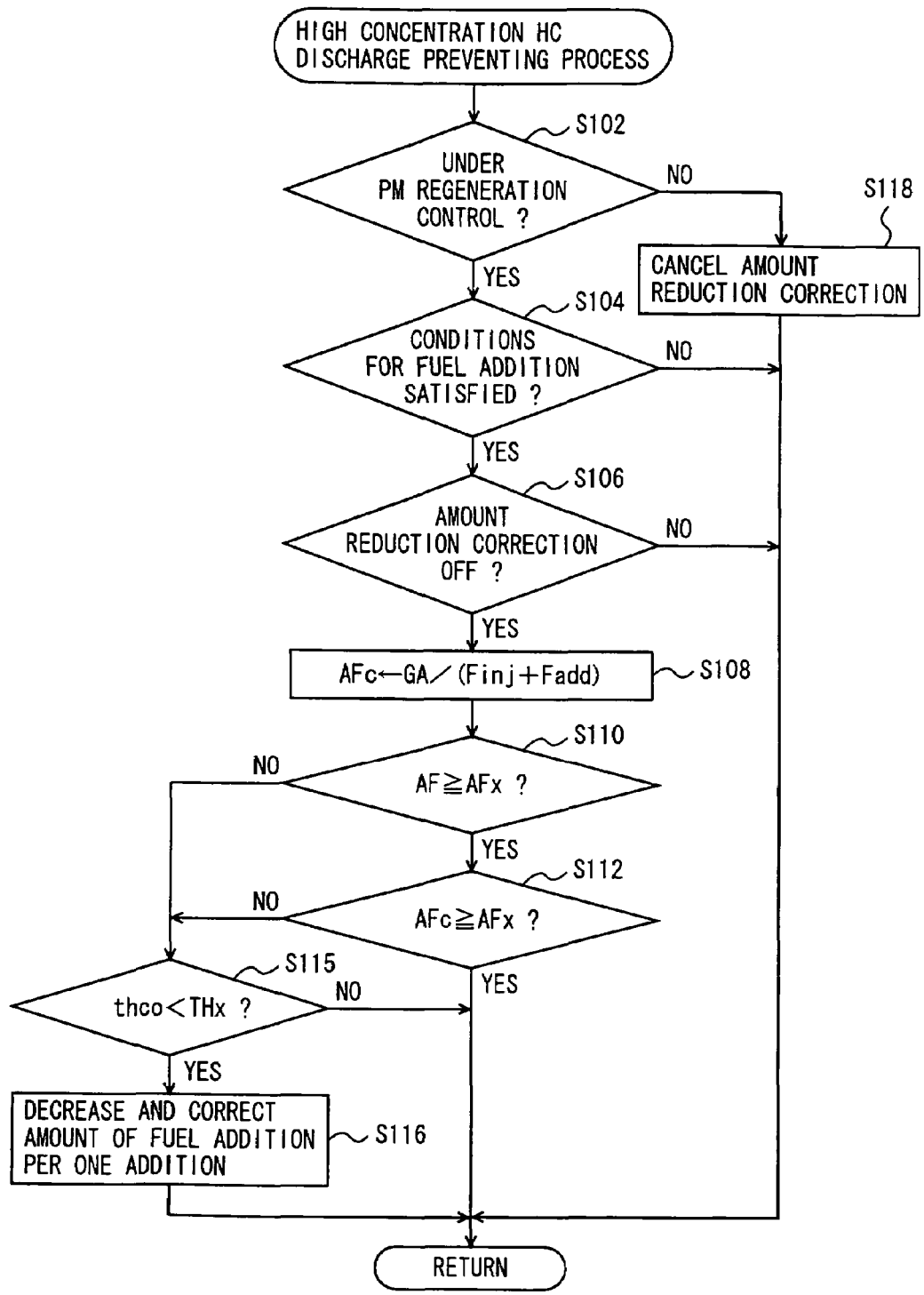
FIG. 5 is a flowchart representing an example of high-concentration HC discharge preventing process in accordance with a second embodiment of the present invention.

The present embodiment differs from the first embodiment in that the high-concentration HC discharge preventing process of FIG. 5 is executed in place of the process of FIG. 2. Except for this point, the structure is the same as that of the first embodiment, and therefore, description will be given with reference to FIG. 1.

In the high-concentration HC discharge preventing process (FIG. 5), processes of steps S102 to S112, S116 and S118 are the same as those of FIG. 2 described with reference to the processes of the same reference characters. The different point is that when determination of step S112 is "yes", the process is temporarily stopped, and when determination of step S110 or S112 is "no", determination is made as to whether the exhaust temperature thco is lower than the reference temperature THx or not (step S115). If thco<THx ("yes" in S115), the fuel addition amount decreasing correction process (S116) is executed, and if thco≧Thx ("no" in S115), the process is temporarily terminated.

Therefore, the fuel addition amount decreasing correction process (S116) is executed when AF<AFx ("no" in S110) and thco<THx ("yes" in S115) or when AFc<AFx ("no" in S112) and thco<THx ("yes" in S115).

Figure 6:
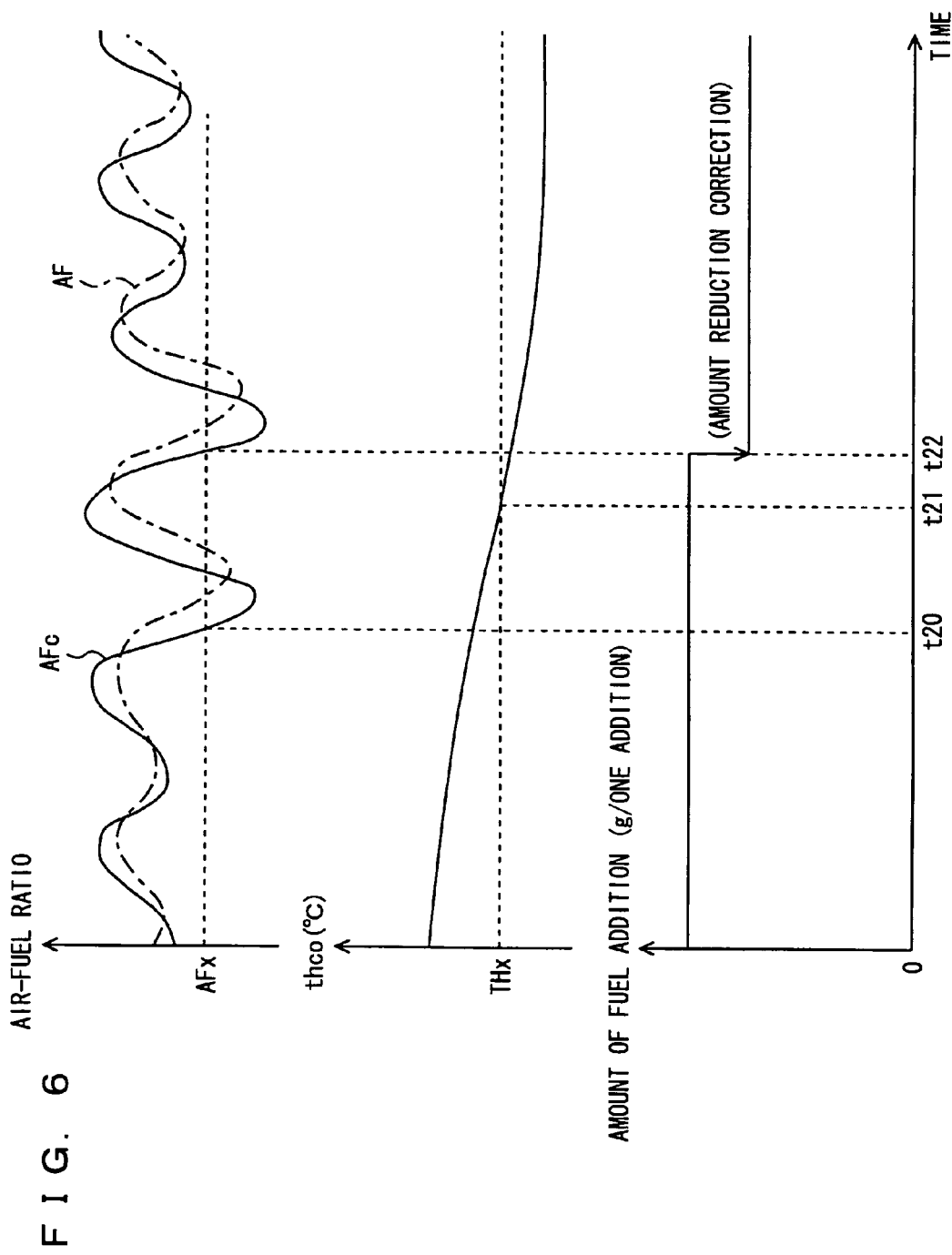
FIG. 6 is a timing chart representing an example of the process in accordance with the second embodiment.

FIG. 6 is a timing chart representing an example of control when calculated air-fuel ratio AFc becomes smaller than reference air-fuel ratio AFx. Even when AFc<AFx ("no" in S112: t0), as long as the exhaust temperature thco is equal to or higher than reference temperature THx ("no" in S115), the amount of fuel addition per one addition is not reduced. When thco becomes smaller than THx (thco<THx: t21) and AFc becomes smaller than AFx (AFc<AFx: t22), however, determination of step S112 becomes "no" and determination of step S115 becomes "yes", and then the amount of fuel addition at one time is reduced (S116). Consequently, calculated air-fuel ratio AFc as well as actually measured air-fuel ratio AF increase, and generation of white smoke caused by the discharge of high-concentration HC to the outside can be prevented.

In the structure described above, ECU 70 corresponds to the unburned fuel concentration physical amount detecting unit, added fuel concentration decreasing unit and air-fuel ratio detecting unit; air-fuel ratio sensor 48 corresponds to the air-fuel ratio detecting unit; and the second exhaust temperature sensor corresponds to the catalyst temperature detecting unit. The process of step S108 of high-concentration HC discharge preventing process (FIG. 5) corresponds to the process performed by the air-fuel ratio detecting unit, and the process other than step S108 corresponds to the process performed by the added fuel concentration decreasing unit.

The above-described second embodiment of the present invention provides the following effects.

(A) By the combination of steps S110 and S115 or combination of steps S112 and S115 of the high-concentration HC discharge preventing process, whether high-concentration, unburned fuel would be discharged or not is determined. Specifically, when air-fuel ratio AF or calculated air-fuel ratio FAc is smaller than the reference air-fuel ratio AFx and exhaust temperature thco is lower than the reference temperature THx, it is determined that high-concentration, unburned fuel, particularly, white smoke, would be discharged. When it is determined that such high-concentration, unburned fuel would be discharged, the amount of fuel addition at one time is reduced and corrected (S116) in the PM regeneration control.

Therefore, discharge of high-concentration HC to the outside can be prevented, and the amount of fuel addition at one time can be reduced only in the region where possibility of white smoke generation is high. Consequently, the PM regeneration control process can be done quickly with high efficiency.

(B) The same effect as effect (B) of the first embodiment can be attained.

OTHER EMBODIMENTS (a) The high-concentration HC discharge preventing process in accordance with the first embodiment (FIG. 2)

includes three conditions of steps S110, S112 and S114. Only one or two of these conditions may be used for the process.

The high-concentration HC discharge preventing process in accordance with the second embodiment (FIG. 5) also includes three conditions of steps S110, S112 and S115. Of these three conditions, combination of steps S111 and S115 or S112 and S115 may be used for the process.

(b) In each of the embodiments described above, as the catalyst temperature, the exhaust temperature thco immediately downstream of filter 38a detected by the second exhaust temperature sensor 46 is used. When a temperature sensor is provided in filter 38a, the temperature detected by this sensor may be used.

(c) In each of the embodiments described above, a diesel particulate filter referred to as "DPNR" (Diesel Particulate NOx Reduction) carrying an NOx purifying catalyst and a catalyst for oxidizing trapped particulate matter is used. A filter not carrying the NOx purifying catalyst may be used. Specifically, a diesel particulate filter referred to as "DPF" (Diesel Particulate Filter) carrying a catalyst for oxidizing trapped particulate matter may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exhaust gas purifier for an internal combustion engine, including an exhaust purifying filter that filters particulate matter in the exhaust gas and that allows regeneration by oxidizing the deposited particulate matter, by utilizing catalytic function, and by executing a process of increasing temperature for purifying the particulate matter on the exhaust purifying filter by adding fuel to an exhaust system from upstream of the exhaust purifying filter, upon oxidizing the particulate matter, the exhaust gas purifier comprising:

an unburned fuel concentration physical amount detecting unit for detecting at least one of a physical amount reflecting unburned fuel concentration existing in the exhaust gas at the downstream of said exhaust purifying filter and a physical amount having an influence on said unburned fuel concentration; and an added fuel concentration decreasing unit that decreases, when a value of the physical amount detected by said unburned fuel concentration physical amount detecting unit indicates discharge of high-concentration unburned fuel, fuel concentration attained by addition in said process of increasing temperature for purifying the particulate matter, in said process of increasing temperature for purifying the particulate matter, wherein said unburned fuel concentration physical amount detecting unit includes an air-fuel ratio detecting unit that detects, as said physical amount, air-fuel ratio of the exhaust gas downstream of a position of fuel addition in an exhaust system;

wherein in said process of increasing temperature for purifying the particulate matter, said added fuel concentration decreasing unit determines that a state in which the air-fuel ratio detected by said air-fuel ratio detecting unit is smaller than a reference air-fuel ratio for determining high-concentration state of fuel indicates the state where the value of physical amount indicates discharge of high-concentration unburned fuel, and decreases fuel concentration attained by addition in said process of increasing temperature for purifying the particulate matter;

wherein said unburned fuel concentration physical amount detecting unit includes, in addition to said air-fuel ratio detecting unit, a catalyst temperature detecting unit that detects a catalyst temperature of said exhaust purifying filter; and wherein in said process of increasing temperature for purifying the particulate matter, said added fuel concentration decreasing unit determines that a state in which the air-fuel ratio detected by said air-fuel ratio detecting unit is smaller than said reference air-fuel ratio and the catalyst temperature detected by said catalyst temperature detecting unit is lower than a reference temperature for determining degradation of oxidation catalysis indicates the state where the value of physical amount indicates discharge of high-concentration unburned fuel, and decreases fuel concentration attained by addition in said process of increasing temperature for purifying the particulate matter.

2. The exhaust gas purifier for an internal combustion engine according to claim 1, applied to an internal combustion engine having a turbo charger with an exhaust turbine arranged downstream of a position where the fuel is added, in the exhaust system.

3. An exhaust gas purifier for an internal combustion engine, including an exhaust purifying filter that filters particulate matter in the exhaust gas and that allows regeneration by oxidizing the deposited particulate matter, by utilizing catalytic function, and by executing a process of increasing temperature for purifying the particulate matter on the exhaust purifying filter by adding fuel to an exhaust system from upstream of the exhaust purifying filter, upon oxidizing the particulate matter, the exhaust gas purifier comprising:

an unburned fuel concentration physical amount detecting unit for detecting at least one of a physical amount reflecting unburned fuel concentration existing in the exhaust gas at the downstream of said exhaust purifying filter and a physical amount having an influence on said unburned fuel concentration; and an added fuel concentration decreasing unit that decreases, when a value of the physical amount detected by said unburned fuel concentration physical amount detecting unit indicates discharge of high-concentration unburned fuel, fuel concentration attained by addition in said process of increasing temperature for purifying the particulate matter, in said process of increasing temperature for purifying the particulate matter, wherein said unburned fuel concentration physical amount detecting unit includes an air-fuel ratio detecting unit that detects, as said physical amount, air-fuel ratio of said exhaust gas by air-fuel ratio calculation based on an amount of fuel burned by the combustion engine, an amount of fuel added in an exhaust system and an amount of intake air of the internal combustion engine;

wherein in said process of increasing temperature for purifying the particulate matter, said added fuel concentration decreasing unit determines that a state in which the air-fuel ratio detected by said air-fuel ratio detecting unit is smaller than a reference air-fuel ratio for determining high-concentration state of fuel indicates the state where the value of physical amount indicates discharge of high-concentration unburned fuel, and decreases fuel concentration attained by addition in said process of increasing temperature for purifying the particulate matter;

wherein said unburned fuel concentration physical amount detecting unit includes, in addition to said air-fuel ratio detecting unit, a catalyst temperature detecting unit that detects a catalyst temperature of said exhaust purifying filter; and wherein in said process of increasing temperature for purifying the particulate matter, said added fuel concentration decreasing unit determines that a state in which the air-fuel ratio detected by said air-fuel ratio detecting unit is smaller than said reference air-fuel ratio and the catalyst temperature detected by said catalyst temperature detecting unit is lower than a reference temperature for determining degradation of oxidation catalysis indicates the state where the value of physical amount indicates discharge of high-concentration unburned fuel, and decreases fuel concentration attained by addition in said process of increasing temperature for purifying the particulate matter.

4. The exhaust gas purifier for an internal combustion engine according to claim 3, applied to an internal combustion engine having a turbo charger with an exhaust turbine arranged downstream of a position where the fuel is added, in the exhaust system.

5. An exhaust gas purifier for an internal combustion engine, including an exhaust purifying filter that filters particulate matter in the exhaust gas and that allows regeneration by oxidizing the deposited particulate matter, by utilizing catalytic function, and by executing a process of increasing temperature for purifying the particulate matter on the exhaust purifying filter by adding fuel to an exhaust system from upstream of the exhaust purifying filter, upon oxidizing the particulate matter, the exhaust gas purifier comprising:

an unburned fuel concentration physical amount detecting unit for detecting at least one of a physical amount reflecting unburned fuel concentration existing in the exhaust gas at the downstream of said exhaust purifying filter and a physical amount having an influence on said unburned fuel concentration; and an added fuel concentration decreasing unit that decreases, when a value of the physical amount detected by said unburned fuel concentration physical amount detecting unit indicates discharge of high-concentration unburned fuel, fuel concentration attained by addition in said process of increasing temperature for purifying the particulate matter, in said process of increasing temperature for purifying the particulate matter, wherein said unburned fuel concentration physical amount detecting unit includes a catalyst temperature detecting unit that detects, as said physical amount, a catalyst temperature of said exhaust purifying filter, and wherein in said process of increasing temperature for purifying the particulate matter, said added fuel concentration decreasing unit determines that a state in which the catalyst temperature detected by said catalyst temperature detecting unit is lower than a reference temperature for determining degradation of oxidation catalysis indicates the state where the value of physical amount indicates discharge of high-concentration unburned fuel, and decreases fuel concentration attained by addition in said process of increasing temperature for purifying the particulate matter.

6. The exhaust gas purifier for an internal combustion engine according to claim 5, applied to an internal combustion engine having a turbo charger with an exhaust turbine arranged downstream of a position where the fuel is added, in the exhaust system.

* * * * *